M. SIMONS.
Strainer for Coffee and Tea Pots.
No. 3,462. Reissued May 25, 1869.
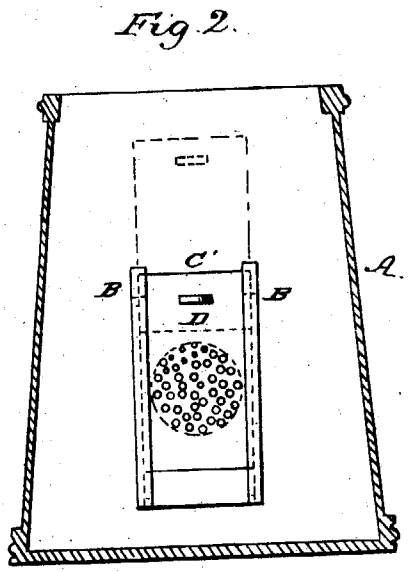
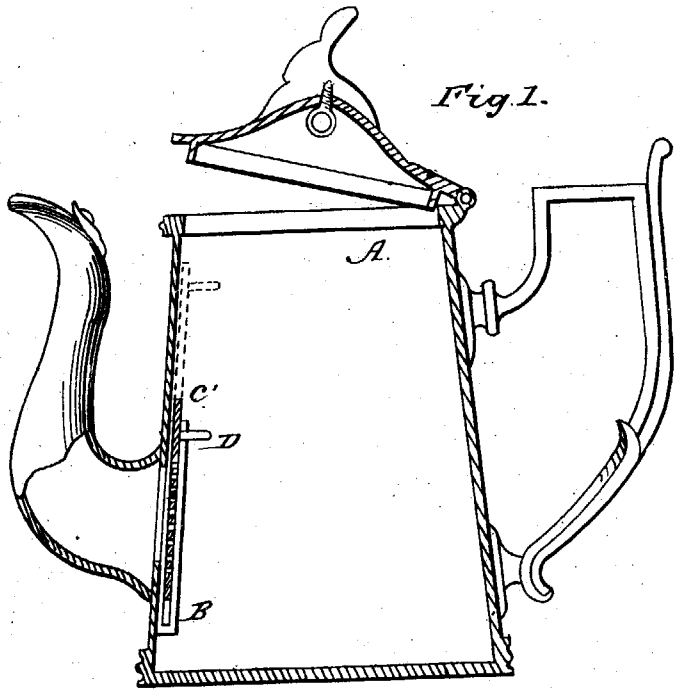
Witnesses
A. M. Bacon.
Levy Dillenberg
Inventor
Michael Simons
By his Atty
J. Franklin Reynolds
THE NORRIS PETERS CO., WASHINGTON, D. C.

United States Patent Office.

GEORGE A. LAWRENCE, OF SPRINGFIELD, MASSACHUSETTS, ASSIGNEE, BY MESNE ASSIGNMENTS, OF MICHAEL SIMONS.

*Letters Patent No.* 62,697, *dated March* 5, 1867; *reissue No.* 3,462, *dated May* 25, 1869.

STRAINER FOR COFFEE AND TEAPOTS.

The Schedule referred to in these Letters Patent and making part of the same.

*To all whom it may concern:*

Be it known that MICHAEL SIMONS, of Middletown, in the county of Middlesex, and State of Connecticut, invented a new and useful Improved Strainer for Coffee and Teapots; and that the following is a full and exact description thereof, reference being had to the accompanying drawings, and to the letters of reference marked thereon, and making a part of this specification, in which—

Figure 1 represents a sectional view of the coffee or teapot, with its strainer.

Figure 2 represents a view of the sliding strainer, as operating in the coffee or teapot.

The nature of the invention consists in the slide, with its handle and guides, and they may be made either of Britannia-ware, or of any other metal, and be coated, or covered thoroughly with a metal, or compound which will not rust or corrode by contact with the liquid in the coffee or teapot, so that the slide, or guides will not rust and adhere to each other, or the flavor or taste of the tea or coffee will not be injured.

In the drawings—

A represents an ordinary coffee, or teapot.

B B are grooved guides, and are attached to each side of the aperture of the spout, on the inside of the coffee, or teapot.

C is a strainer, having a projection, D, thereon, to be used as a handle, for the purpose of raising or depressing the strainer, or for removing said strainer from the vessel, for the purpose of cleaning it when necessary.

Said strainer is perforated, to correspond with the aperture at the base of the spout, and when operated by means of the handle D, can be moved in a vertical direction in the guides B B.

The object of this movable strainer is, to enable the housewife to remove it, and clean off the sediment, that often collects in such quantity as to prevent the coffee or tea from being poured out clearly through the spout, frequently choking up entirely the spouts of coffee and teapots, as now constructed; and, by the use of a removable strainer, much time and labor is saved in cleaning it.

To prevent, therefore, any liability to rust or corrode, either in the strainer or its guides, and thereby preventing it from being removed, for the purpose of being cleaned, on account of rusting, the strainer and its guides are made either of Britannia-ware, or are made of any other suitable metal, and covered, or coated with some metal, or amalgam, which will not rust or corrode from the action of the liquid in the vessels; the object of this invention being to have a removable strainer, which will not rust or corrode.

He does not claim the strainer as constructed by John Bamber, and patented May 19, 1863, neither does he claim a strainer, operated by a ring and upright lever; but

Having thus described the invention,

What he claims as new, and desires to secure by Letters Patent, is—

The arrangement and combination of the removable strainer C, having a handle, D, thereon, with the guides B B, when made of Britannia-ware, or of other substance or metal, rendered non-corrosive, and attached to, and operating on the inside of the base of a tea, or coffee-pot, all constructed and operating substantially in the manner and for the purposes herein described and set forth.

GEORGE A. LAWRENCE.

Witnesses:

T. A. CURTIS,

F. E. RICE.